(12) United States Patent
Shishido (10) Patent No.: US 8,451,334 B2
(45) Date of Patent: May 28, 2013

(54) CALIBRATION PATTERN FOR IMAGING DEVICE

(75) Inventor: Yuko Shishido, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 118 days.

(21) Appl. No.: 13/118,809

(22) Filed: May 31, 2011

(65) Prior Publication Data

US 2011/0310256 A1    Dec. 22, 2011

(30) Foreign Application Priority Data

Jun. 17, 2010  (JP) ................................ 2010-137907

(51) Int. Cl.
*H04N 17/00* (2006.01)
*H04N 17/02* (2006.01)
*H04N 7/18* (2006.01)
*G06K 9/00* (2006.01)

(52) U.S. Cl.
USPC ........... 348/188; 348/187; 348/181; 348/129; 382/106

(58) Field of Classification Search
None
See application file for complete search history.

(56) References Cited

U.S. PATENT DOCUMENTS

| | | | | |
|---|---|---|---|---|
| 4,509,075 A * | 4/1985 | Simms et al. | ................. | 348/129 |
| 5,245,413 A * | 9/1993 | Teichner et al. | ............. | 348/181 |
| 6,026,172 A * | 2/2000 | Lewis et al. | .................... | 382/106 |
| 2007/0229665 A1* | 10/2007 | Tobiason et al. | ............. | 348/187 |
| 2009/0059299 A1* | 3/2009 | Yoshida | ....................... | 358/1.18 |
| 2010/0020180 A1* | 1/2010 | Hill et al. | ...................... | 348/188 |

FOREIGN PATENT DOCUMENTS

JP    08-170907    7/1996

* cited by examiner

*Primary Examiner* — Jefferey Harold
*Assistant Examiner* — Sean Haiem
(74) *Attorney, Agent, or Firm* — Greenblum & Bernstein, P.L.C.

(57) ABSTRACT

A calibration pattern is provided with a central portion and a frame pattern provided outside thereof, the central portion being provided with a rectangular light area in the central portion of the calibration pattern. The frame pattern has a horizontal pattern and a vertical pattern, the horizontal pattern extending to two horizontal sides centering the central portion and alternately provided with a light area and a dark area at a predetermined interval different from an equal interval, the vertical pattern extending to two vertical sides centering the central portion and alternately provided with a light area and a dark area at a predetermined interval different from an equal interval. The horizontal pattern and the vertical pattern include edges, each being positioned equally distant from a predetermined position in the central portion to the two sides, and the edges have an identical change direction of a gray value.

19 Claims, 12 Drawing Sheets

| Device size | Vision field size (mm) | | |
|---|---|---|---|
| | Vertical | Horizontal | Diagonal |
| 1 4/1" | 12.8 | 17.1 | 21.4 |
| 1" | 9.6 | 12.8 | 16.0 |
| 2/3" | 6.6 | 8.8 | 11.0 |
| 1/2" | 4.8 | 6.4 | 8.0 |
| 1/3" | 3.3 | 4.4 | 5.5 |

| | | Calibration pattern | | |
|---|---|---|---|---|
| | | Light area | Dark area | Light/dark area |
| Measured object | Light area | 0 | $+2\delta$ | $+\delta$ |
| | Dark area | $-2\delta$ | 0 | $-\delta$ |
| | Light/dark area | $-\delta$ | $+\delta$ | 0 |

Fig. 12

CALIBRATION PATTERN FOR IMAGING DEVICE

CROSS-REFERENCE TO RELATED APPLICATIONS

The present application claims priority under 35 U.S.C. §119 of Japanese Application No. 2010-137907 filed on Jun. 17, 2010, the disclosure of which is expressly incorporated by reference herein in its entirety.

BACKGROUND OF THE INVENTION

1. Field of the Invention

The present invention relates to a calibration pattern for an imaging device, particularly a calibration pattern for an imaging device to be shot, or captured, by an imaging device to correct measurement error of the imaging device.

2. Description of Related Art

Conventionally known imaging devices include an image measurer and an optical device, the image measurer measuring a length of an object based on a captured image thereof. Such an imaging device captures a predetermined calibration pattern to correct measurement error. The calibration pattern is a combination of an area of a light image (hereinafter referred to as a light area) and an area of a dark image (hereinafter referred to as a dark area) in capturing by an imaging device. The imaging device then detects an edge, which is a boundary of a light area and a dark area, and measures a distance between two edges having a known length (hereinafter referred to as a reference length) to correct measurement error. The two edges for measuring the length are called measurement edges hereinafter.

Such an imaging device sometimes has a zoom function to shoot an enlarged image of an object. In this case, the imaging device captures a plurality of calibration patterns in sizes according to zoom magnification to correct measurement error. The vision field of the imaging device changes depending on a device size of an imaging element and zoom magnification of the imaging device. With a small ratio of a distance between measurement edges relative to the vision field of the imaging device, the measurement error can not be sufficiently reduced due to aberration of a lens in the imaging device.

Figure 8A:
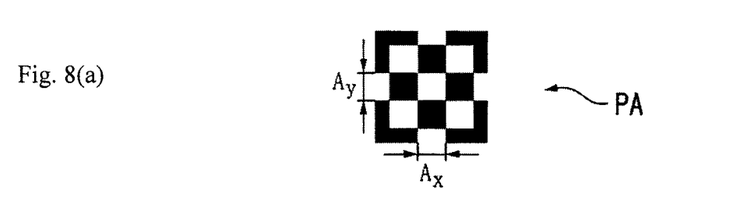
FIGS. 8(a) to 8(e) illustrate an example of a conventional calibration pattern.
Figure 8B:
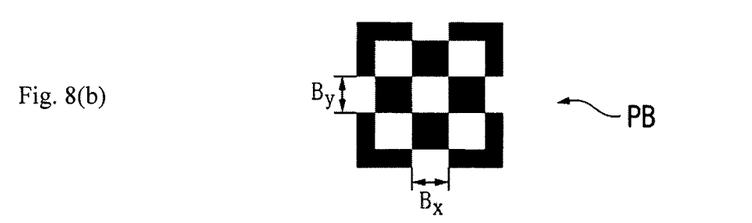
Figure 8C:
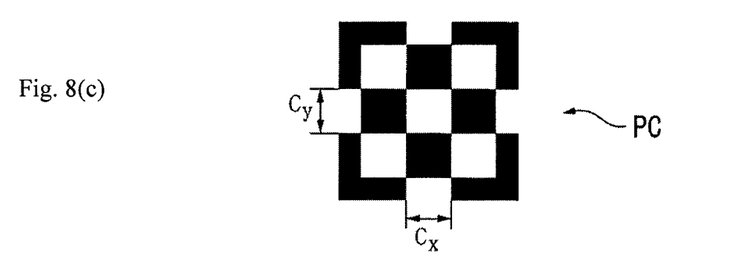
Figure 8D:
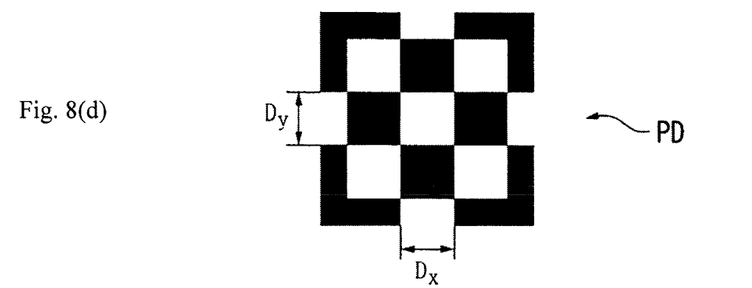
Figure 8E:
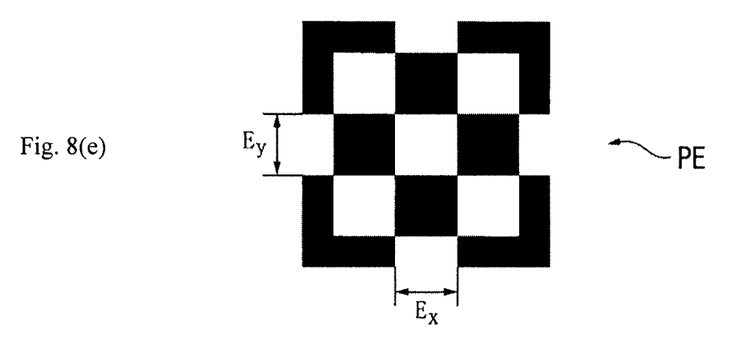

FIGS. 8(a) to 8(e) illustrate an example of conventional calibration patterns. In the drawings, a light area is represented by white and a dark area is represented by black (same applies to drawings hereinafter). In a calibration pattern PA, a square light area is placed at the central portion of the calibration pattern PA, and four dark areas having the same shape as the light area are placed above, below, left of, and right of the light area, as shown in FIG. 8(a), for example. An imaging device measures horizontal and vertical lengths of the light area in the calibration pattern PA as reference lengths Ax and Ay, respectively, and corrects measurement error. As shown in FIGS. 8(b) to 8(e), calibration patterns PB to PE are used in cases where the zoom magnification is reduced. The calibration patterns PB to PE are similar to the calibration pattern PA. The calibration patterns PB to PE have reference lengths Bx to Ex, respectively, and By to Ey, respectively.

Figure 9A:
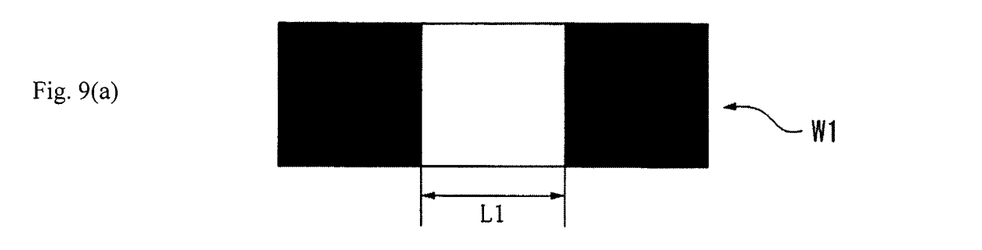
FIGS. 9(a) and 9(b) illustrate a state of image processing to measure a horizontal length of a light area between dark areas.

FIGS. 9(a) and 9(b) illustrate a state of image processing to measure a horizontal length of a light area between dark areas. As shown in the upper figure of FIG. 9(a), an object W1 has a square light area in the middle and two dark areas having the same shape as the light area on the left and right thereof. The object W1 is captured by an imaging device to measure the horizontal length L1 of the light area of the object W1. In an image of the object W1, the light area and the dark areas spread out due to a lighting condition. It is deemed in the explanation below that the image Im1 of the object W1 includes the spreading light area, as shown in the lower figure of FIG. 9(a).

Figure 9B:
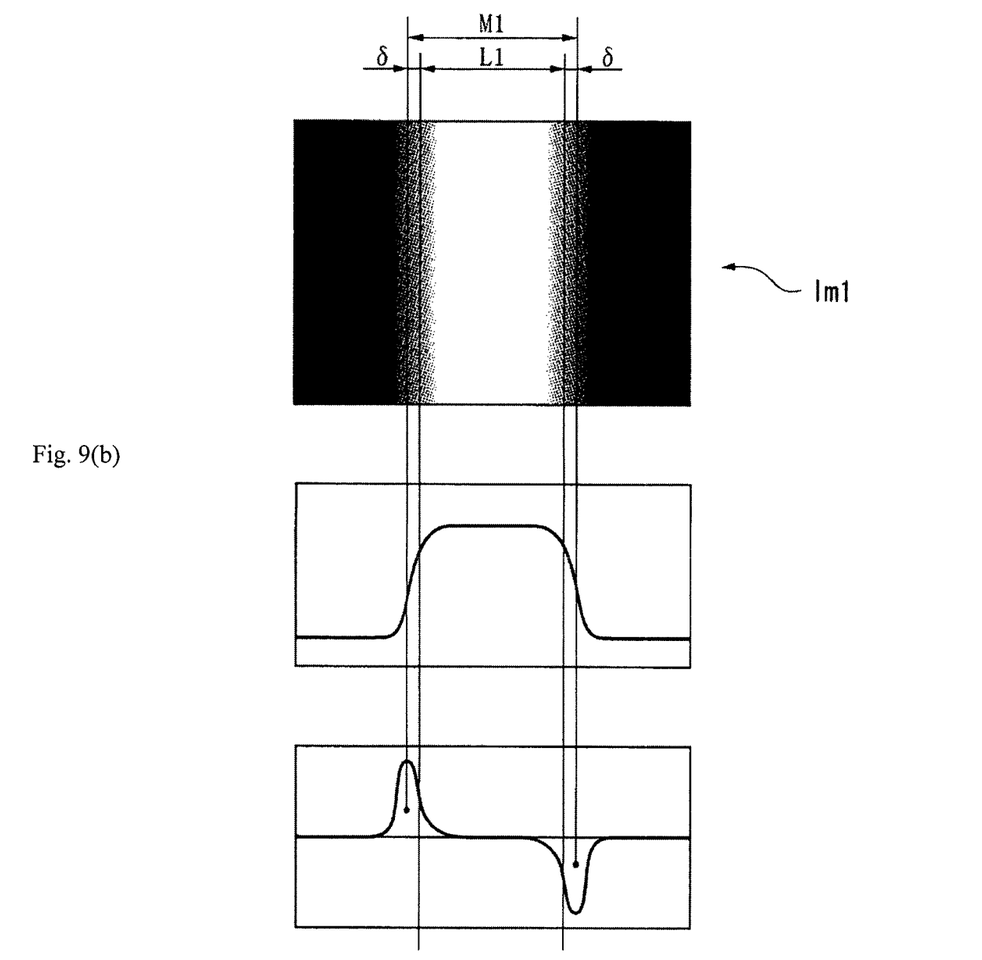

The horizontal gray value of the image Im1 suddenly changes outside the light area of the object W1, as shown in the upper figure of FIG. 9(b). Peaks of a differential curve obtained by differentiating the gray value are thus located outside of the light area of the object W1, as shown in the lower figure of FIG. 9(b). The distance between the peaks of the differential curve corresponding to the length L1 is measured as a distance between measurement edges of the length L1. Then, the measured value is a length M1, as shown in FIG. 9(a), thus causing measurement errors on both sides in opposite directions of the length L1, which is a true value. If the measurement error on one side is $\delta$, the measurement errors on the both sides are $+2\delta$.

Figure 10A:
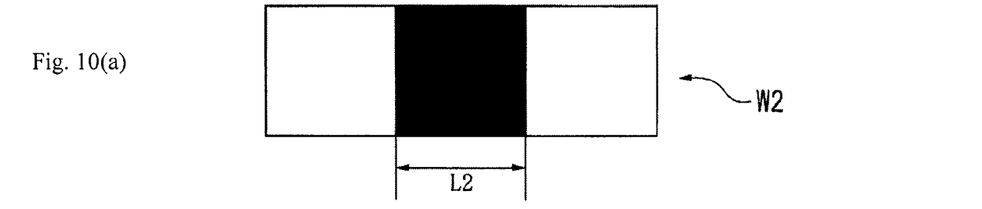
FIGS. 10(a) and 10(b) illustrate a state of image processing to measure a horizontal length of a dark area between light areas.

FIGS. 10(a) and 10(b) illustrate a state of image processing to measure a horizontal length of a dark area between light areas. As shown in the upper figure of FIG. 10(a), an object W2 has a pattern in which light and dark areas are reversed from the object W1. The horizontal length L2 of the dark area of the object W2 is the same as the horizontal length L1 of the light area of the object W1. It is deemed in the explanation below that an image Im2 of the object W2 includes spreading light areas, as shown in the lower figure of FIG. 10(a), similar to the image Im1 of the object W1.

Figure 10B:
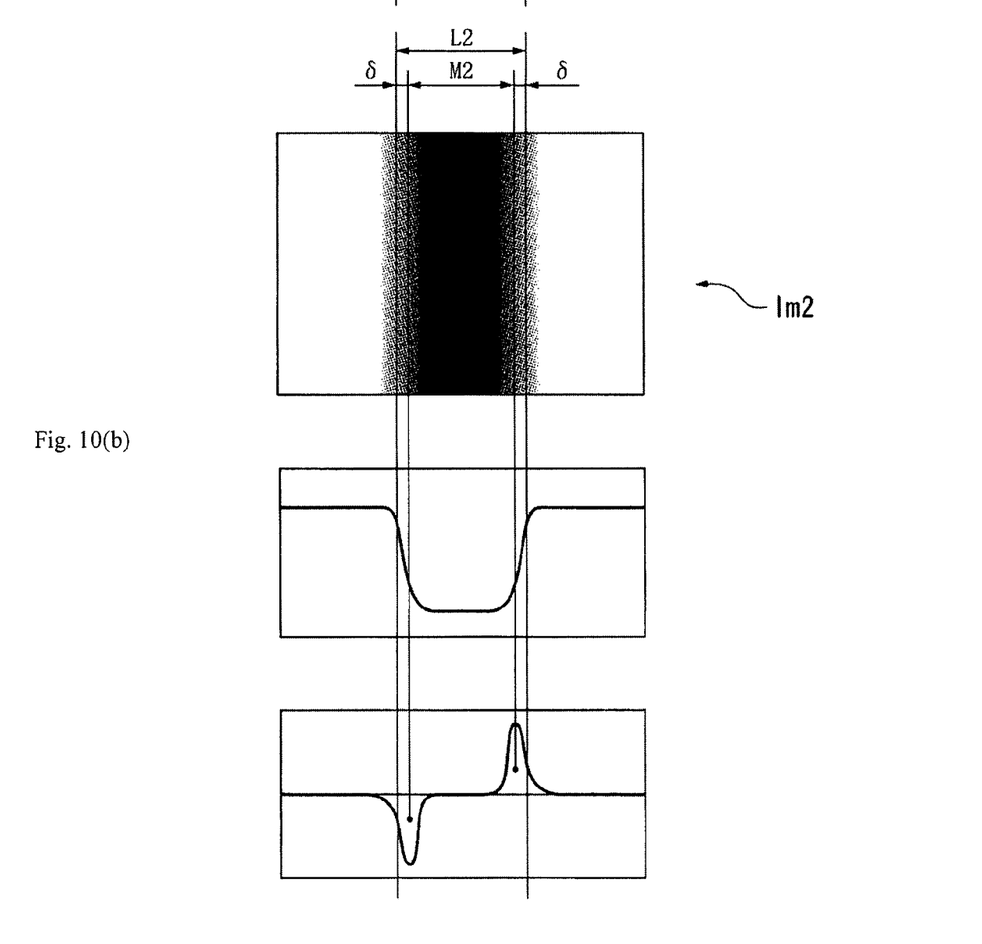

The horizontal gray value of the image Im2 suddenly changes inside the dark area of the object W2, as shown in the upper figure of FIG. 10(b). Peaks of a differential curve obtained by differentiating the gray value are thus located inside of the dark area of the object W2, as shown in the lower figure of FIG. 10(b). The distance between the peaks of the differential curve corresponding to the length L2 is measured as a distance between measurement edges of the length L2. Then, the measured value is a length M2, as shown in FIG. 10(a), thus causing measurement errors on both sides in opposite directions of the length L2, which is a true value. If the measurement error on one side is $\delta$, the measurement errors on the both sides are $-2\delta$.

As described above, in the case where the change direction of the gray value on one of the measurement edges increases while the change direction of the gray value on the other measurement edge decreases, in other words, in the case where the change directions are different on the measurement edges, a circumstance arises where a measurement error of $\pm 2\delta$ relative to the true value is observed due to a lighting condition. To address the circumstance, a calibration pattern is known in which change directions of measurement edges are identical to reduce measurement error relative to a true value (refer to Japanese Patent Laid-open Publication No. H8-170907, for example). A principle is explained below in which a measurement error relative to a true value is reduced with identical change directions of measurement edges.

Figure 11A:
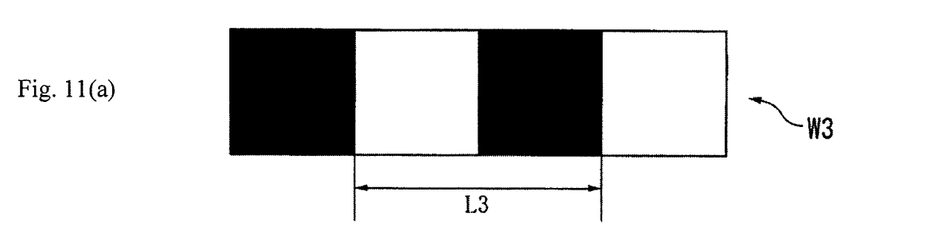
FIGS. 11(a) and 11(b) illustrate a state of image processing in a case where change directions of measurement edges of an object are identical.

FIGS. 11(a) and 11(b) illustrate a state of image processing in a case where change directions of measurement edges of an object are identical. As shown in the upper figure of FIG. 11(a), an object W3 has a pattern in which square light areas and dark areas are alternately provided in the horizontal direction. The object W3 is captured by an imaging device to measure a horizontal length L3 of the middle light area and dark area of the object W3. In an image of the object W3, the light and the dark areas spread out due to a lighting condition. It is deemed in the explanation below that the image Im3 of the object W3 includes the spreading light area, as shown in the lower figure of FIG. 11(a).

Figure 11B:
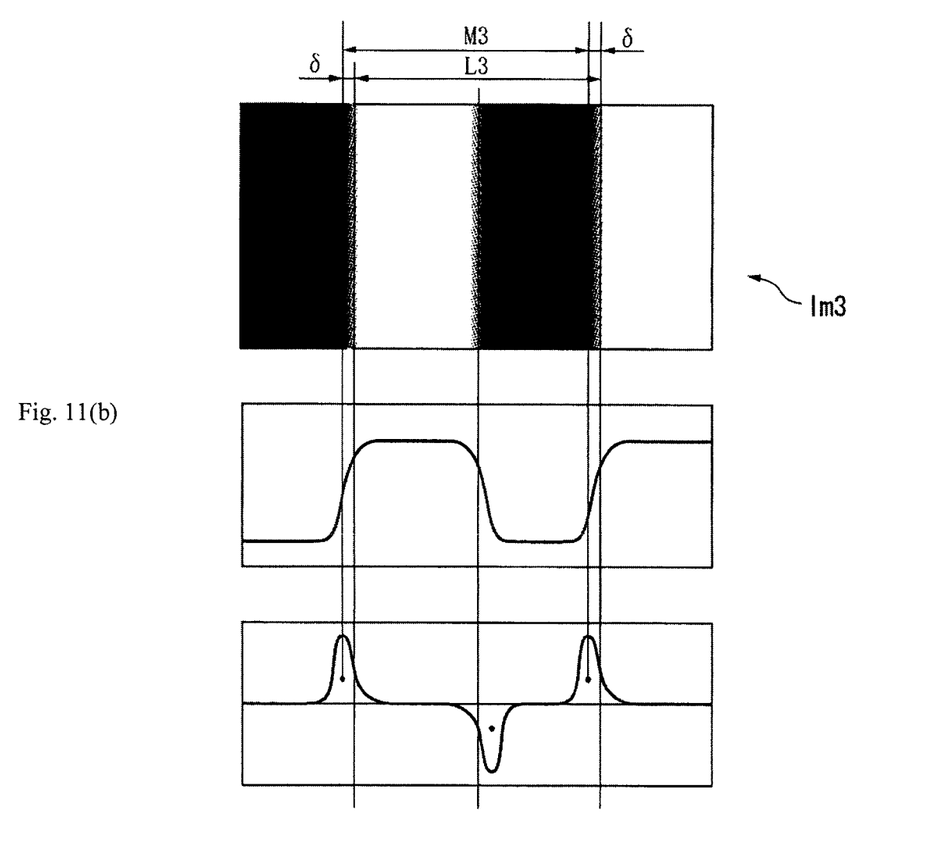

A horizontal gray value of the image Im3 suddenly changes outside the light areas of the object W3, as shown in the upper figure of FIG. 11(b). Peaks of a differential curve obtained by differentiating the gray value are thus located outside of the light areas of the object W3, as shown in the lower figure of FIG. 11(b). The distance between the peaks of the differential curve corresponding to the length L3 is measured as a distance between measurement edges of the length L3. Then, the measured value is a length M3, as shown in FIG. 11(a), thus causing measurement errors on both sides in an identical direction of the length L3, which is a true value. If the measurement error on one side is δ, the measurement errors on both sides are 0. With the measurement edges in identical change direction, the measurement error relative to the true value can be reduced even in the case affected by a lighting condition.

The calibration pattern disclosed in Japanese Patent Laid-open Publication No. H8-1709071 has a plurality of concentrically disposed measurement edges. With the calibration pattern of Japanese Patent Laid-open Publication No. H8-170907, the measurement error of an imaging device can thus be corrected without a change of a calibration pattern according to zoom magnification, unlike a conventional calibration pattern. Thereby, calibration time for an imaging device can be reduced. Furthermore, the calibration pattern of Japanese Patent Laid-open Publication No. H8-170907 allows correction of measurement error without positioning of an imaging device even if zoom magnification is changed. Thus, the central position of an image can be calibrated in the case where zoom magnification is changed.

However, even in the case where the calibration pattern of Japanese Patent Laid-open Publication No. H8-170907, which has the measurement edges in the identical change direction, is captured to correct measurement error, measurement error occurs in measurement of a measured object having measurement edges in different change directions. In the explanation below, the pattern of the object W1 to measure the length of a light area is referred to as a light area measurement pattern; the pattern of the object W2 to measure the length of a dark area is referred to as a dark area measurement pattern; and the pattern of the object W3 to measure the length of light and dark areas is referred to as a light/dark area measurement pattern. The light area measurement pattern and the dark area measurement pattern measure measurement edges in different change directions. The light/dark area measurement pattern measures measurement edges in the identical change direction.

Figure 12:
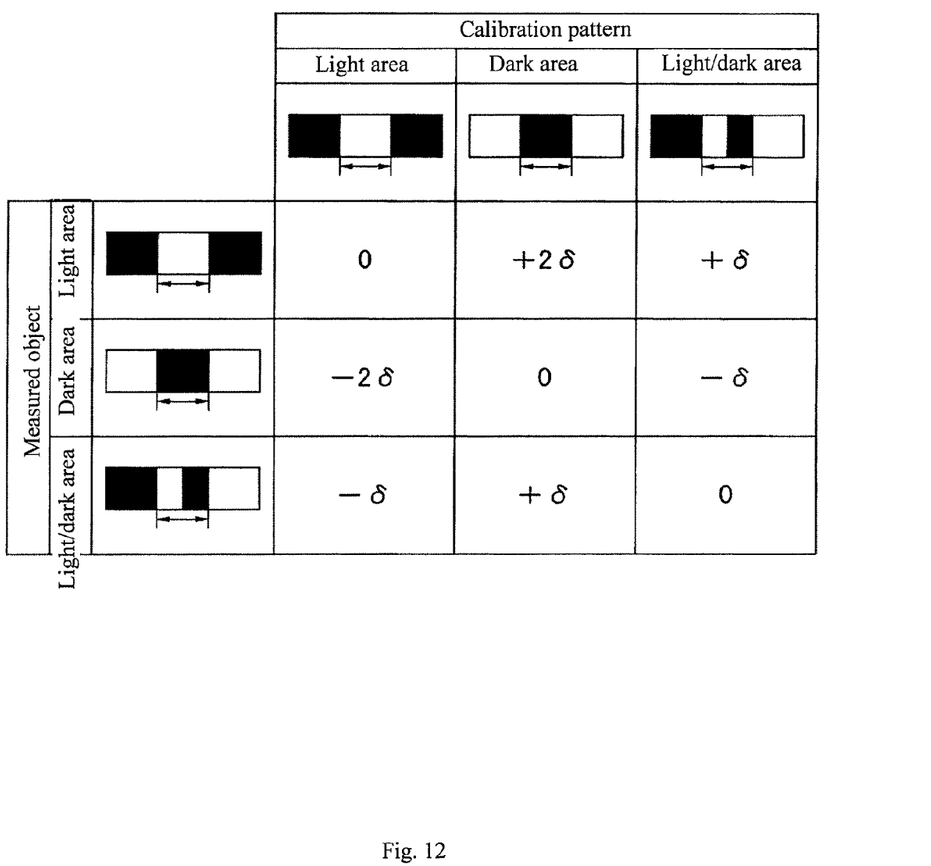
FIG. 12 illustrates a relationship between a combination of a calibration pattern and a measured object and a measurement error.

FIG. 12 illustrates a relationship between a combination of a calibration pattern and a measured object and measurement error. A measured object having the light/dark area measurement pattern is captured in a case where a calibration pattern having the light/dark area measurement pattern is captured to correct measurement error. Then, the measurement error is 0, as shown in FIG. 12. In this case, however, measuring a measured object having the light area measurement pattern or the dark area measurement pattern results in a measurement error of ±δ.

A measured object having the light area measurement pattern is captured in a case where a calibration pattern having the light area measurement pattern is captured to correct measurement error. Then, the measurement error is 0. A measured object having the dark area measurement pattern is captured in a case where a calibration pattern having the dark area measurement pattern is captured to correct measurement error. Then, the measurement error is 0. Specifically, in the case where the calibration pattern and the measurement pattern of the measured object are the same, the measurement error is 0. It is thus desirable to select a measurement pattern for calibration according to a measurement pattern of a measured object.

SUMMARY OF THE INVENTION

The present invention provides a calibration pattern for an imaging device, the calibration pattern reducing measurement error regardless of a measurement pattern of a measured object.

An aspect of the present invention provides a calibration pattern for an imaging device, the calibration pattern being captured by an imaging device to correct measurement error of the imaging device that measures a length of an object based on a captured image of the object. The calibration pattern includes a central portion provided with one of a rectangular light area and a rectangular dark area in a central portion of the calibration pattern; a horizontal pattern extending in two horizontal sides centering the central portion and alternately provided with the light area and the dark area at a predetermined interval different from an equal interval; and a vertical pattern extending in two vertical sides centering the central portion and alternately provided with the light area and the dark area at a predetermined interval different from an equal interval. In the calibration pattern, the horizontal pattern and the vertical pattern include edges, each being a boundary between the light area and the dark area at a position equally distant from a predetermined position in the central portion to the two sides; and the edges have an identical change direction of a gray value.

In the configuration above, a middle point of a reference length is set at a predetermined position in the central portion. Edges on the horizontal pattern and the vertical pattern equally distant from the middle point to the two horizontal sides and the two vertical sides, respectively, are defined as measurement edges of the reference length. Then, the change directions of the measurement edges of each reference length are identical. In other words, the calibration pattern of the present invention can be used as a calibration pattern having a light/dark area measurement pattern.

In the configuration above, the middle point of the reference length is set at a position where the ratio is 1:1 to the length of the horizontal side and vertical side of the central portion. Edges on the horizontal pattern and the vertical pattern equally distant from the middle point to the two horizontal sides and the two vertical sides, respectively, are defined as measurement edges of the reference length. Then, the change directions of the measurement edges of each reference length are different. In other words, the calibration pattern of the present invention can be used as a calibration pattern having a light area measurement pattern or a dark area measurement pattern. Thereby, an appropriate measurement pattern can be selected for the calibration pattern according to a measurement pattern of a measured object, and thus measurement error can be reduced regardless of the measured pattern of the measured object.

Furthermore, the horizontal pattern and the vertical pattern are composed of alternating light and dark areas. Similar to the calibration pattern disclosed in Japanese Patent Laid-open Publication No. H8-170907, the patterns include a plurality of concentrically disposed measurement edges. Thereby, the calibration time of an imaging device can be reduced, and the central position of an image can be corrected in the case where zoom magnification is changed.

It is preferred in the present invention that the distance between the edges be set at a predetermined ratio to the vision field of the imaging device.

According to the configuration above, the distance between the edges is set at a predetermined ratio to the vision field of the imaging device, and thus measurement error can sufficiently be reduced.

It is preferred in the present invention that a frame pattern be provided in which a plurality of frame portions are alternately and concentrically arranged around the central portion as the center, the frame portions including the light area and the dark area, each having a rectangular shape, and that the horizontal pattern and the vertical pattern be included in the frame pattern.

The configuration above achieves functions and effects similar to those of the above-described calibration pattern. Furthermore, the simple frame pattern allows easy production of the calibration pattern.

It is preferred in the present invention that a spiral pattern be provided in which two spiral portions are provided in parallel, the spiral portions including the light area and the dark area, each having a spiral shape, and that the horizontal pattern and the vertical pattern be included in the spiral pattern.

The configuration above achieves functions and effects similar to those of the above-described calibration pattern. Furthermore, the simple spiral pattern allows easy production of the calibration pattern.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

First Embodiment

Figure 1:
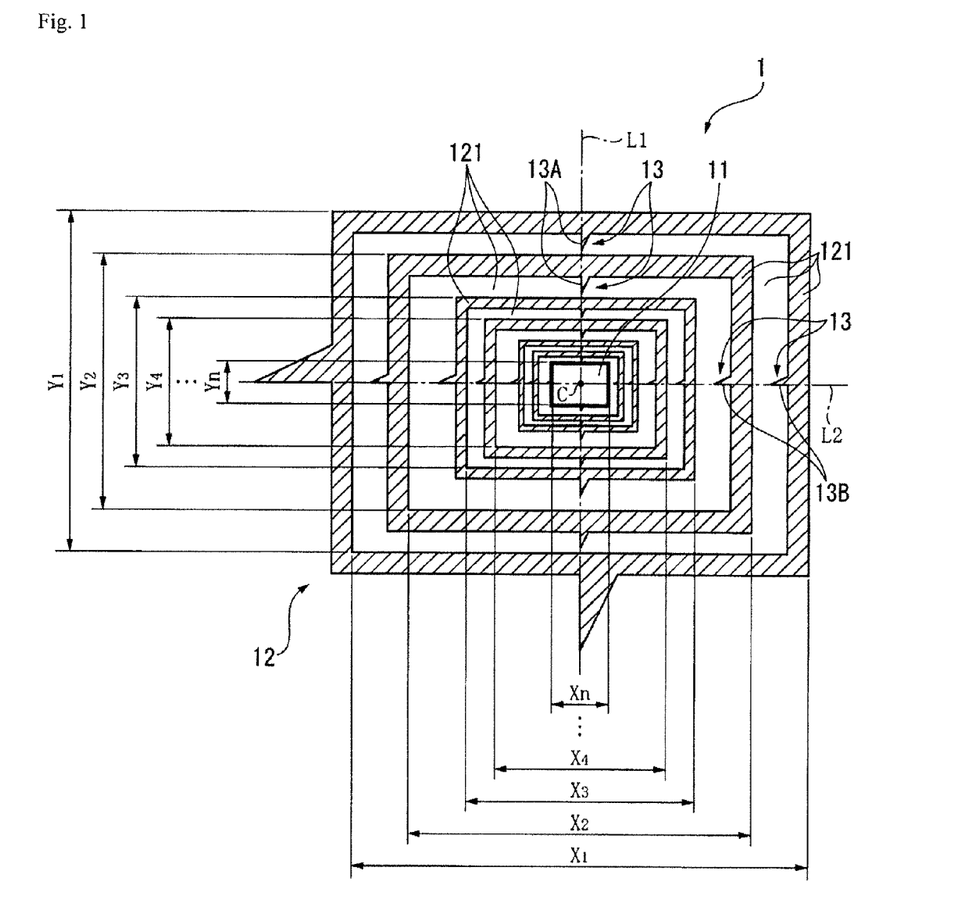
FIG. 1 illustrates a calibration pattern according to a first embodiment of the present invention.

A first embodiment of the present invention is explained below with reference to the drawings. FIG. 1 illustrates a calibration pattern 1 according to the first embodiment of the present invention. In FIG. 1, a light area is indicated with a white area, and a dark area is indicated with a shaded area (the same applies hereinafter). The calibration pattern 1 is captured by an imaging device (not shown in the drawing) in order to correct the measurement error of the imaging device that measures a length of an object based on the captured image of the object. As shown in FIG. 1, the calibration pattern 1 has a central portion 11 and a frame pattern 12, the central portion 11 being provided with a rectangular light area in the central portion of the calibration pattern 1, the frame pattern 12 being provided outside the central portion 11.

The frame pattern 12 has a plurality of frame portions 121 provided with rectangular frame-shaped light areas and dark areas, each of which has edges equally distant from a predetermined position C (intersection of dashed-dotted lines L1 and L2 in FIG. 1) in the central portion 11 to two horizontal sides and two vertical sizes. The frame portions 121 are alternately and concentrically arranged around the central portion 11 as the center at predetermined intervals different from an equal interval. The aspect ratio of the central portion 11 and the frame portions 121 are set so as to be identical to an aspect ratio of an imaging device. In the frame pattern 12, a change direction of a gray value in each of the edges is identical, the edges being equally distant from the position C to the two horizontal sides and in the two vertical sides. In the explanation below, the distance between the edges equally distant from the position C to the two horizontal sides is defined as $X_1$ to $X_n$; and the distance between the edges equally distant from the position C to the two vertical sides is defined as $Y_1$ to $Y_n$.

In the present embodiment, a horizontal pattern and a vertical pattern are included in the frame pattern 12. In other words, the frame pattern 12 includes the horizontal pattern and the vertical pattern, the horizontal pattern extending to the two horizontal sides centering the central portion 11 and having the alternating light areas and dark areas at the predetermined intervals different from the equal interval, the vertical pattern extending to the two vertical sides centering the central portion 11 and having the alternating light areas and dark areas at the predetermined intervals different from the equal interval.

The calibration pattern 1 has a positioning pattern 13 which is displayed along vertical and horizontal directions of an image and is aligned with the two reference lines L1 and L2 that intersect at the center of the image in capturing by an imaging device for positioning thereof. The positioning pattern 13 includes a plurality of shapes at predetermined intervals in the vertical and horizontal directions from the center of the calibration pattern 1. Specifically, each of the shapes has a dark right triangular shape. The shapes provided in the vertical direction have only one side 13A parallel to the vertical direction; and the shapes provided in the horizontal direction have only one side 13B parallel to the horizontal direction. The extended lines of sides 13A and 13B pass through the position C of the calibration pattern 1.

The shapes of the positioning pattern 13 are provided in contact with the edges of the dark areas of the frame portions 121, the edges being different from the edges equally distant from the position C to the two horizontal sides and the two vertical sides. Furthermore, the shapes of the positioning pattern 13 are larger as being distant from the center of the calibration pattern 1.

Figure 2:
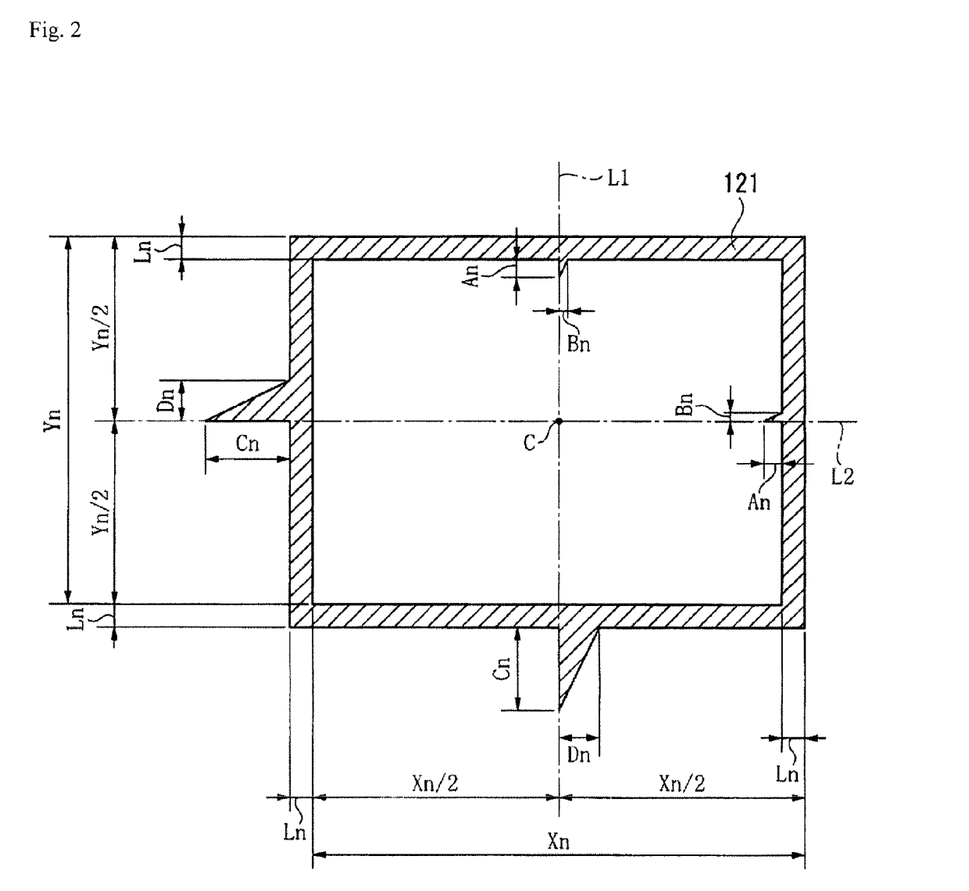
FIG. 2 illustrates a frame portion provided with a dark area according to the first embodiment of the present invention.

FIG. 2 illustrates the frame portion 121 provided with a dark area. In the dark area of the frame portion 121, a frame width $L_n$, a height $A_n$ and a base size $B_n$ of the positioning pattern 13 provided inside, and a height $C_n$, and a base size $D_n$ of the positioning pattern 13 provided outside are set in addition to the distances $X_n$ and $Y_n$ between the edges, as shown in FIG. 2. Specifically, the distance $X_n$ between the edges is set based on a horizontal vision field size $q_n$ of an imaging element of an imaging device, a predetermined ratio R, and a zoom magnification $M_n$, as represented in an expression (1) below. The distance $Y_n$ between the edges is set based on a vertical vision field size $p_n$ of an imaging element of an imaging device, a predetermined ratio R, and a zoom magnification $M_n$, as represented in an expression (2) below. In other words, the distances $X_n$ and $Y_n$ between the edges are set to be the predetermined ratio R relative to the vision field of the imaging device, which varies depending on the device size of the imaging element of the imaging device and the zoom magnification $M_n$.

$$X_n = q_n \times R \times M_n \quad (1)$$

$$Y_n = p_n \times R \times M_n \quad (2)$$

Figure 3:
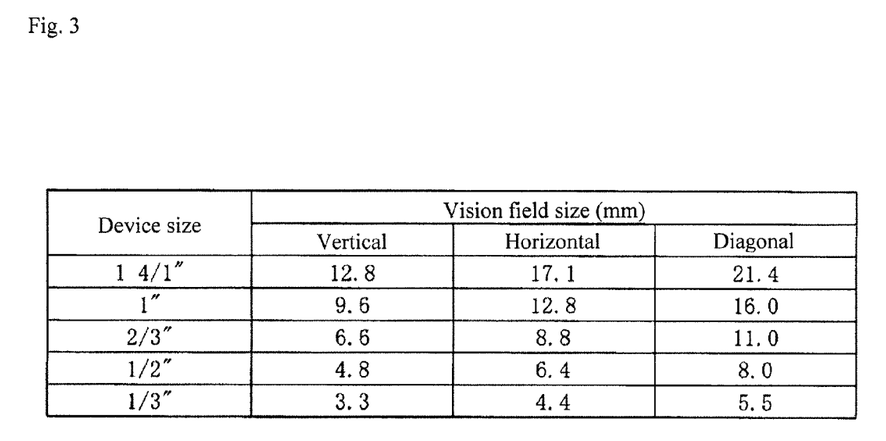
FIG. 3 illustrates a relationship between a device size of an imaging element and vision field dimensions of the imaging element according to the first embodiment of the present invention.

FIG. 3 illustrates a relationship between a device size of an imaging element and vision field dimensions of the imaging element. FIG. 3 indicates from the left, the device size of the imaging element, and the vertical vision field size $p_n$, the horizontal vision field size $q_n$, and the diagonal visual field size of the imaging element. To set the distance $X_n$ between the edges, the vertical vision field size $p_n$ of the imaging element (refer to FIG. 3) and the zoom magnification $M_n$ are selected, and then the distance $X_n$ between the edges is set such that the predetermined ratio R is 0.6 to 0.9. Similarly, to set the distance $Y_n$ between the edges, the horizontal vision field size $q_n$ of the imaging element (refer to FIG. 3) and the zoom magnification $M_n$ are selected, and then the distance $Y_n$ between the edges is set such that the predetermined ratio R is 0.6 to 0.9. In the present embodiment, the distances $X_n$ and $Y_n$ between the edges are set such that the predetermined ratio R is 0.6 to 0.9. Thereby, even in the case where the visual field of the imaging device is changed according to the device size of the imaging element and the zoom magnification $M_n$, a ratio of the distance between the measurement edges is great relative to the vision field of the imaging device.

The frame width $L_n$ is set based on the distances $X_n$ and $Y_n$, between the edges, as represented in an expression (3) below.

$$L_n = \frac{(Y_n - Y_{n+1})}{4} = \frac{(X_n - X_{n+1})}{4} \quad (3)$$

The height $A_n$ and the base size $B_n$, of the positioning pattern 13 provided inside, and the height $C_n$ and the base size $D_n$ of the positioning pattern 13 provided outside are set based on the frame width $L_n$ as represented in an expression (4) below.

$$A_n = L_n \times 0.8, \ B_n = \frac{A_n}{2}, \ C_n = A_{n-1}, \ D_n = B_{n-1} \quad (4)$$

As described above, the distances $X_n$ and $Y_n$ between the edges are set such that the predetermined ratio is 0.6 to 0.9. In order to prevent interference among the frame portions 121, the distances $X_n$ and $Y_n$ between the edges are set so as to meet conditions represented in expressions (5) and (6).

$$\frac{X_{n+1}}{2} + L_{n+1} + C_{n+1} < \frac{X_n}{2} < \frac{X_{n-1}}{2} - (L_{n-1} + A_{n-1}) \quad (5)$$

$$\frac{Y_{n+1}}{2} + L_{n+1} + C_{n+1} < \frac{Y_n}{2} < \frac{Y_{n-1}}{2} - (L_{n-1} + A_{n-1}) \quad (6)$$

A method is explained below in which the calibration pattern 1 is captured to correct measurement error of an imaging device. To use the calibration pattern 1 as a calibration pattern having a light/dark area measurement pattern, a middle point of a reference length is set at the position C. A user of an imaging device can position the calibration pattern 1 relative to the imaging device by relatively moving the imaging device and the calibration pattern 1 so as to align the reference lines L1 and L2 with the sides 13A and 13B of the positioning pattern 13. The edges on the frame pattern 12 equally distant from the middle point to the two horizontal sides and the two vertical sides are defined as the measurement edges of the reference length. Specifically, the reference length includes $X_1$ to $X_n$ and $Y_1$ to $Y_n$. Setting the middle point and the reference length as above provides identical change directions in the measurement edges of the reference length, thus allowing the calibration pattern 1 to be used as the calibration pattern having the light/dark area measurement pattern.

To use the calibration pattern 1 as a calibration pattern having a light area measurement pattern or a dark area measurement pattern, a middle point of a reference length is set at a position where the ratio is 1:1 to the length of the horizontal side and vertical side of the central portion 11 (not shown in the drawing). In order to facilitate setting of the middle point of the reference length to the position, a positioning pattern different from the positioning pattern 13 may be employed. The edges on the frame pattern 12 equally distant from the middle point to the two horizontal sides and the two vertical sides are defined as the measurement edges of the reference length. Setting the middle point and the reference length as above provides different change directions in the measurement edges of the reference length, thus allowing the calibration pattern 1 to be used as the calibration pattern having the light area measurement pattern or the dark area measurement pattern.

According to the present embodiment, the effects below are obtained.

(1) In the calibration pattern 1, a measurement pattern can be selected according to a measurement pattern of a measured object. Thus, measurement error can be reduced regardless of the measured pattern of the measured object.

(2) The horizontal pattern and the vertical pattern are composed of the alternating light and dark areas, and thus a plurality of measurement edges are concentrically arranged. Thereby, the calibration time of an imaging device can be reduced. Furthermore, the central position of an image can be corrected in the case where zoom magnification is changed.

(3) The distances $X_n$ and $Y_n$ between the edges are provided at the predetermined ratio R to a visual field of an imaging device. Thus, measurement error can sufficiently be reduced.

(4) The simple frame pattern 12 allows easy production of the calibration pattern 1.

(5) The extended lines of the sides 13A and 13B of the positioning pattern 13 pass through the position C of the calibration pattern 1. Thus, even in the case where the calibration pattern 1 is captured in an enlarged size, a user of an imaging device can align the sides 13A and 13B of the positioning pattern 13 with the reference lines L1 and L2 and thereby position the calibration pattern 1 relative to the imaging device. Furthermore, since the shapes of the positioning pattern 13 each only have one side parallel to the vertical or horizontal direction, the user of the imaging device can easily align the sides 13A and 13B of the positioning pattern 13 with the reference lines L1 and L2. Thus, even in the case where the calibration pattern 1 is enlarged and captured, the user of the imaging device can easily align the positioning pattern 13 with the reference lines L1 and L2.

(6) The shapes of the positioning pattern 13 are provided in contact with the edges of the dark areas of the frame portions 121, the edges being different from the edges equally distant from the position C to the two horizontal sides and the two vertical sides. Thus, the imaging device may detect as measurement edges, the boundaries between the light areas and the dark areas not in contact with the shapes of the positioning pattern 13. Thus, the imaging device can easily detect the measurement edges, and thus appropriately correct measurement error.

(7) The shapes of the positioning pattern 13 are larger as being distant from the center of the calibration pattern 1. Thus, even in the case of the calibration pattern 1, which can correct measurement error of an imaging device without changing a calibration pattern according to the zoom magnification $M_n$, a user of an imaging device can visually check the positioning pattern 13 in an appropriate size in an image captured by the imaging device so as to align the reference lines L1 and L2 to the positioning pattern 13. Thus, the positioning pattern 13 can easily be aligned with the reference lines L1 and L2.

Second Embodiment

Figure 4:
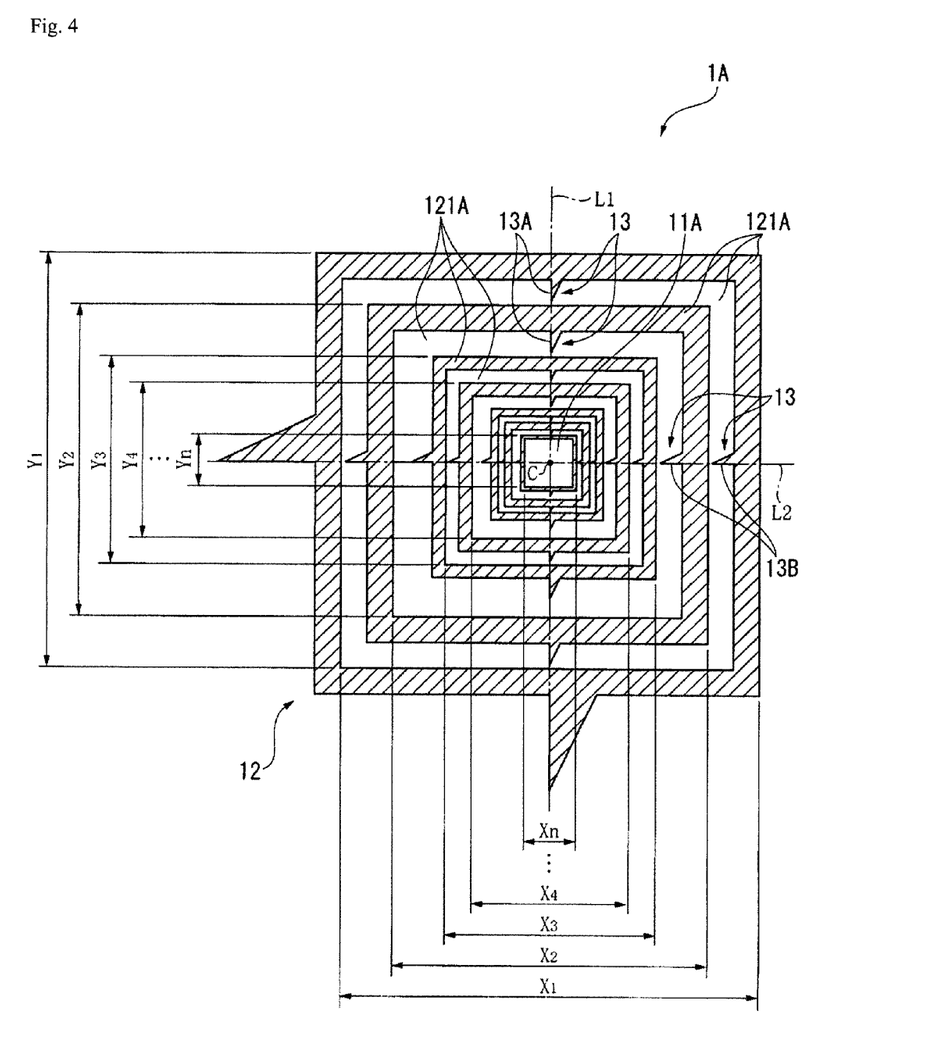
FIG. 4 illustrates a calibration pattern according to a second embodiment of the present invention.
Figure 5:
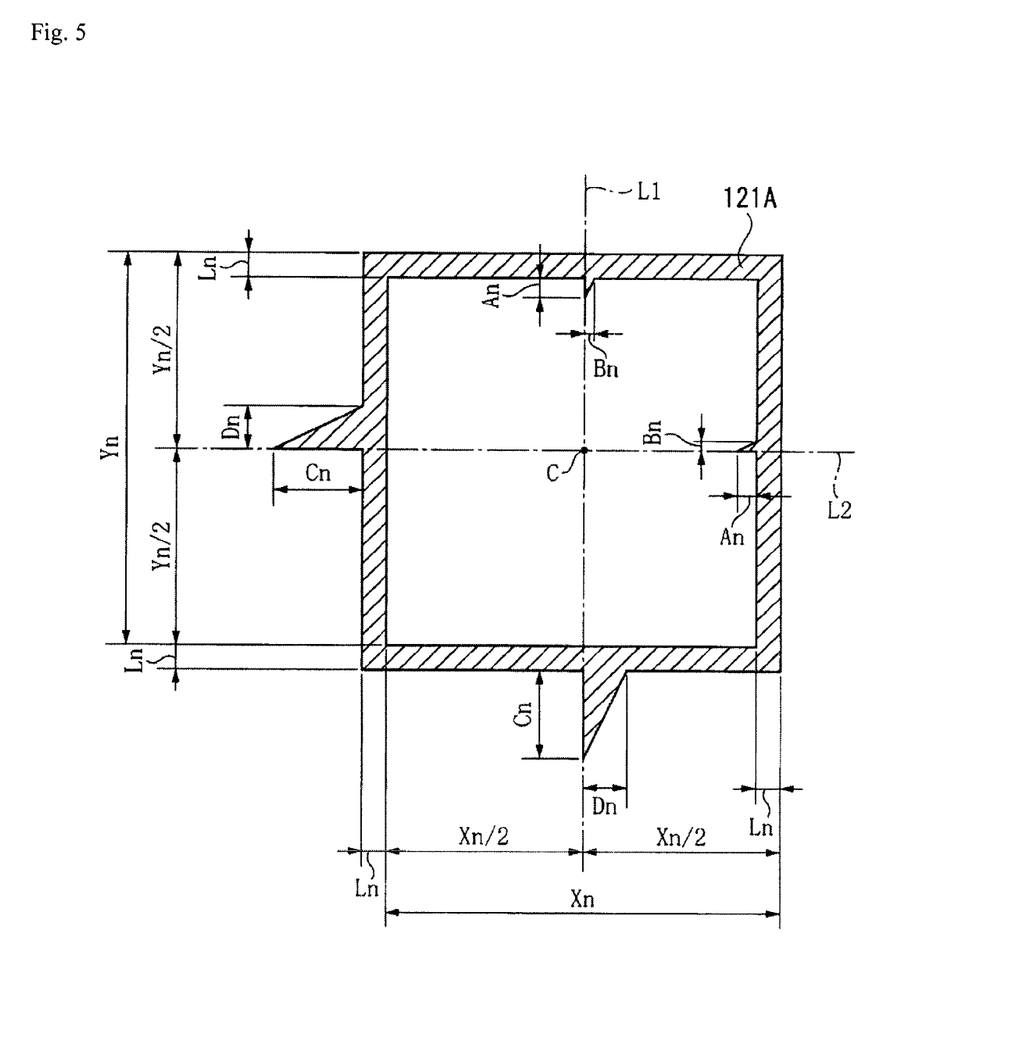
FIG. 5 illustrates a frame portion provided with a dark area according to the second embodiment of the present invention.

A second embodiment of the present invention is explained below with reference to the drawings. The same reference numerals are provided below to the components explained above and the explanations thereof are omitted. FIG. 4 illustrates a calibration pattern 1A according to the second embodiment of the present invention. FIG. 5 illustrates a frame portion 121A provided with a dark area. In the first embodiment, the calibration pattern 1 has the central portion 11 provided with a rectangular light area and the plurality of frame portions 121 having a rectangular frame shape. The present embodiment is different, however, in that the calibration pattern 1A has a central portion 11A provided with a square light area and a plurality of frame portions 121A having a square frame shape, as shown in FIGS. 4 and 5.

In the first embodiment, the distances $X_n$ and $Y_n$ between the edges are set based on the vision field sizes $q_n$ and $p_n$ of the imaging element of the imaging device, the predetermined ratio R, and the zoom magnification $M_n$, as represented in the expressions (1) and (2) above. The present embodiment is different, however, in that the distances $X_n$ and $Y_n$ between the edges are set based on the vertical vision field size $p_n$ of the imaging element of the imaging device, the predetermined ratio R, and the zoom magnification $M_n$, as represented in an expression (7) below. The distances $X_n$ and $Y_n$ between the edges are set based on the vertical vision field size $p_n$ of the imaging element of the imaging device since the vertical vision field size $p_n$ is shorter than the horizontal vision field size $q_n$.

$$X_n = Y_n = p_n \times R \times M_n \quad (7)$$

The functions and effects similar to those in the first embodiment can also be achieved in the present embodiment.

Third Embodiment

Figure 6:
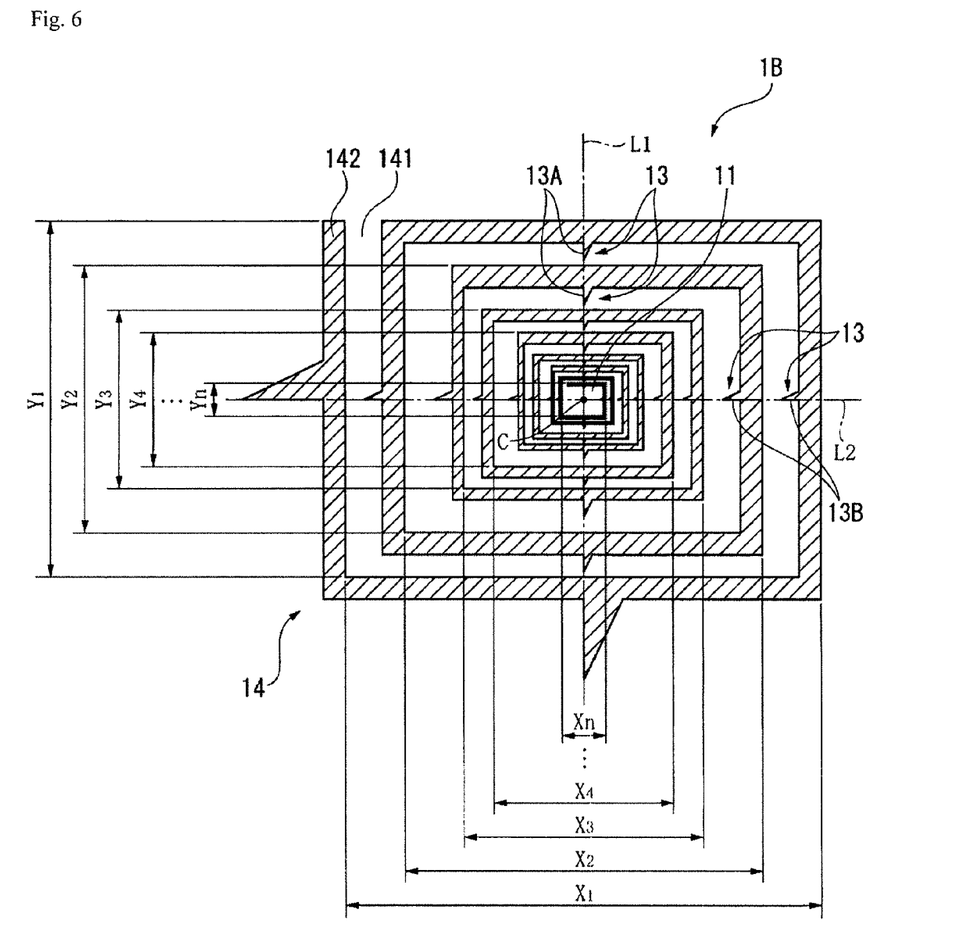
FIG. 6 illustrates a calibration pattern according to a third embodiment of the present invention.

A third embodiment of the present invention is explained below with reference to the drawings. FIG. 6 illustrates a calibration pattern 1B according to the third embodiment of the present invention. In the embodiments above, the calibration patterns 1 and 1A each have the frame pattern 12, which includes the horizontal pattern and the vertical pattern. The present embodiment is different, however, in that the calibration pattern 1B has a swirl (or spiral) pattern 14, which includes a horizontal pattern and a vertical pattern, as shown in FIG. 6.

The calibration pattern 1B has the central portion 11 and the spiral pattern 14 provided outside the central portion 11. The spiral pattern 14 has two spiral portions 141 and 142 provided with a light area and a dark area, respectively, and formed into a spiral shape centering the central portion 11. The spiral portions 141 and 142 are provided in parallel to each other.

Figure 7:
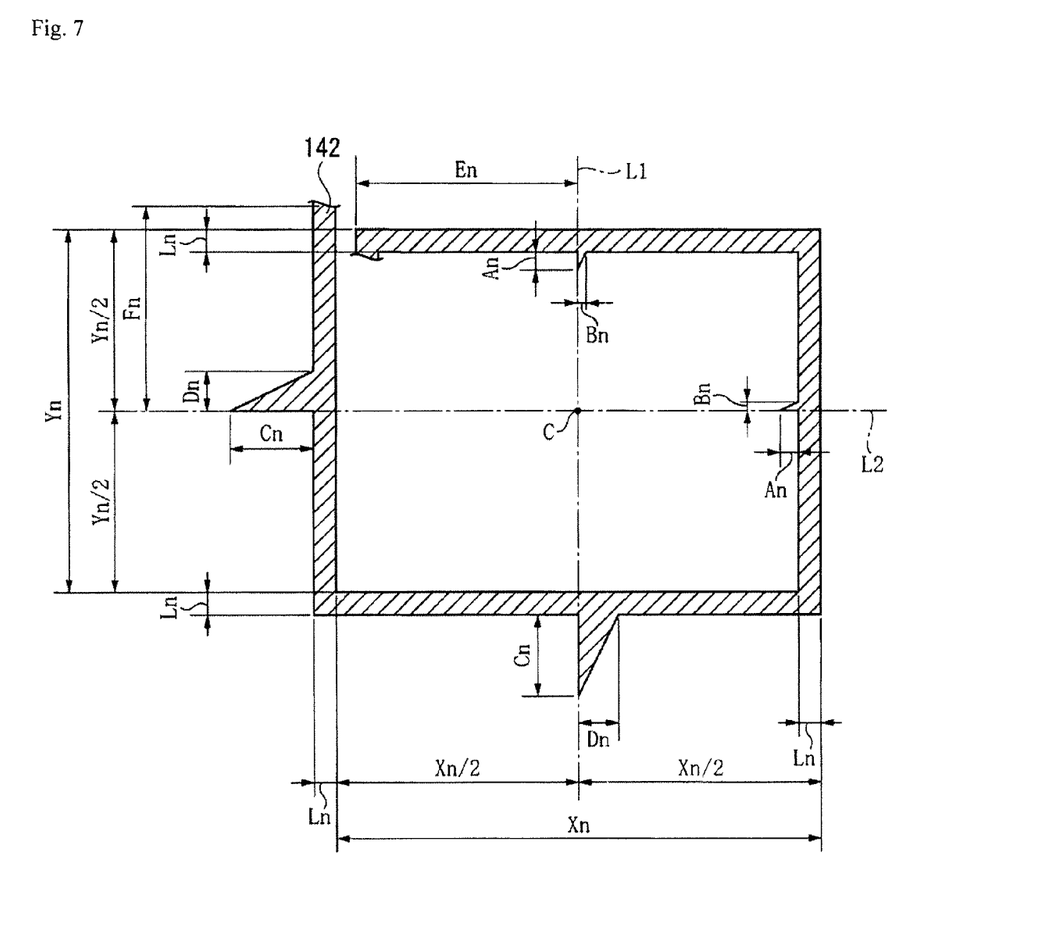
FIG. 7 illustrates a spiral portion provided with a dark area according to the third embodiment of the present invention.

FIG. 7 illustrates the spiral portion 142 provided with a dark area. Similar to the first embodiment, the distances $X_n$ and $Y_n$, the frame width $L_n$, and the dimensions $A_n$, $B_n$, $C_n$, and $D_n$ are set in the spiral portion 142 provided with the dark area. In addition, dimensions $E_n$ and $F_n$ are set, as shown in FIG. 7. Specifically, the dimension $E_n$ is set as represented in an expression (8) below; and the dimension $F_n$ is set as represented in an expression (9) below.

$$E_n = X_{n+1} + L_{n+1} \quad (8)$$

$$F_n = Y_{n-1} L_n \quad (9)$$

The functions and effects similar to (1) to (3) and (5) to (7) in the first embodiment can also be achieved in the present embodiment. In addition, the function and effect below can be achieved.

(8) The simple spiral pattern 14 allows easy production of the calibration pattern 1B.

Modifications

The present invention is not limited to the embodiments above, and may include modifications and improvements within the scope of achieving the object of the present invention. For example, the exemplary calibration patterns 1 to 1B as a calibration pattern in the embodiments may be a different pattern. The calibration pattern may only have to have the central portion, the horizontal pattern, and the vertical pattern.

In the embodiments above, the central portions 11 and 11A are a light area, but may be a dark area. In this case, the light area and dark area in the frame pattern 12 and the spiral pattern 14 may be reversed. Namely, the central portion may be either a light area or a dark area. In the embodiments above, the distance $X_n$ between the edges is set such that the predetermined ratio R is 0.6 to 0.9, but the predetermined ratio R may be different values. Furthermore, the distance between the edges may be set out of the predetermined ratio relative to the vision field of the imaging device. In the embodiments above, the calibration patterns 1 to 1B are provided with the positioning pattern 13, which may be omitted.

The present invention can be applied to a calibration pattern for an imaging device, particularly a calibration pattern for an imaging device to be captured by an imaging device to correct the measurement error of the imaging device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A calibration pattern for an imaging device, the calibration pattern configured to be captured by an imaging device to correct measurement error of the imaging device that measures a length of an object based on a captured image of the object, the calibration pattern comprising:
   a central portion provided with one of a rectangular light area and a rectangular dark area in a central portion of the calibration pattern and;
   a frame pattern provided outside the central portion and comprising a plurality of rectangular frame-shaped portions, each rectangular frame-shaped portion of the plurality of rectangular frame-shaped portions comprising a pair of horizontal sides and a pair of vertical sides, wherein:
   the plurality of rectangular frame-shaped portions comprises a plurality of light area frame-shaped portions and a plurality of dark area frame-shaped portions,
   each light area frame-shaped portion of the plurality of light area frame-shaped portions and each dark area frame-shaped portion of the plurality of dark area frame-shaped portions is alternately provided outwardly from and about the central portion at a predetermined interval different from an equal interval,
   the frame patterns each comprise edges, each edge being a boundary between a said light area frame-shaped portion and a said dark area frame-shaped portion at a position equally distant from a predetermined position in the central portion to the pair of vertical and horizontal sides, and
   the edges have an identical change direction of a gray value, the gray value defined as a value between a respective said light area frame-shaped portion and a respective said dark area frame-shaped portion.

2. The calibration pattern for an imaging device according to claim 1, wherein a distance between the edges is set at a predetermined ratio relative to a visual field of the imaging device.

3. The calibration pattern for an imaging device according to claim 1, wherein each light area frame-shaped portion and each dark area frame-shaped portion is concentrically arranged around the central portion as the center.

4. The calibration pattern for an imaging device according to claim 2, wherein each light area frame-shaped portion and each dark area frame-shaped portion is concentrically arranged around the central portion as the center.

5. The calibration pattern for an imaging device according to claim 1, wherein one of the two vertical sides and two horizontal sides is longer than the other of the two vertical sides and two horizontal sides.

6. The calibration pattern for an imaging device according to claim 1, wherein each dark area frame-shaped portion further comprises a positioning pattern.

7. The calibration pattern for an imaging device according to claim 6, wherein the positioning pattern further comprises a plurality of shapes.

8. The calibration pattern for an imaging device according to claim 6, wherein the positioning pattern has a right-triangular shape.

9. The calibration pattern for an imaging device according to claim 8, wherein a side of the positioning pattern extends in a direction that intersects the central portion of the calibration pattern.

10. The calibration pattern for an imaging device according to claim 7, wherein each shape of the plurality of shapes increases in size as the distance of from the central portion increases.

11. The calibration pattern for an imaging device according to claim 7, wherein a shape of the plurality of shapes is located on a horizontal side of a said dark area frame-shaped portion, and another shape of the plurality of shapes is located on a vertical side of the said dark area frame-shaped portion.

12. A calibration pattern for an imaging device, the calibration pattern configured to be captured by an imaging device to correct measurement error of the imaging device that measures a length of an object based on a captured image of the object, the calibration pattern comprising:
    a central portion provided with one of a rectangular light area and a rectangular dark area in a central portion of the calibration pattern;
    a light area rectangular spiral frame pattern comprising a plurality of pairs of horizontal sides and a plurality of pairs of vertical sides; and
    a dark area rectangular spiral frame pattern comprising a plurality of pairs of horizontal sides and a plurality of pairs of vertical sides,
    wherein:
    each pair of the plurality of pairs of horizontal and vertical sides of the light area rectangular spiral frame pattern, and each pair of the plurality of pairs of horizontal and vertical sides of the dark area rectangular spiral frame pattern is alternately provided outwardly from and about the central portion at a predetermined interval different from an equal interval,
    the calibration pattern further comprises edges, each edge being a boundary between the light area rectangular spiral frame pattern and the dark area rectangular spiral frame pattern at a position equally distant from a predetermined position in the central portion, and
    the edges have an identical change direction of a gray value from the central portion, the gray value defined as a value between a respective said light area frame-shaped portion and a respective said dark area frame-shaped portion.

13. The calibration pattern according to claim 12, wherein the light area rectangular spiral frame pattern conforms to the shape of the dark area rectangular spiral frame pattern.

14. The calibration pattern according to claim 12, wherein one of the plurality of pairs of horizontal sides of the dark area rectangular spiral frame pattern is longer than the other of the plurality of pairs of vertical sides of the dark area rectangular spiral frame pattern.

15. The calibration pattern for an imaging device according to claim 12, wherein each dark area frame-shaped portion further comprises a positioning pattern.

16. The calibration pattern for an imaging device according to claim 15, wherein the positioning pattern further comprises a plurality of shapes.

17. The calibration pattern for an imaging device according to claim 15, wherein the positioning pattern has a right-triangular shape.

18. The calibration pattern for an imaging device according to claim 17, wherein a side of the positioning pattern extends in a direction that intersects the central portion of the calibration pattern.

19. The calibration pattern for an imaging device according to claim 16, wherein each shape of the plurality of shapes increases in size as the distance of from the central portion increases.

* * * * *